United States Patent Office 2,730,554
Patented Jan. 10, 1956

2,730,554

GERMICIDAL DIPHENYL METHANE COMPOUNDS

Guido Schetty, Walter Stammbach and Ernst Model, Basel, Switzerland, assignors to J. R. Geigy A. G., Basel, Switzerland, a Swiss firm No Drawing. Application December 23, 1952, Serial No. 327,669

Claims priority, application Switzerland December 29, 1951

3 Claims. (Cl. 260—619)

The present invention concerns the production of very active germicidal diphenyl methane derivatives which have a wide range of action.

It has been found that by condensation by methods known per se of 4-halogen-1-hydroxybenzenes, of which the 2- and 6-positions are free and which compounds are further substituted in at least one of the positions 3 and 5 by a halogen atom or the trifluoromethyl group, with formaldehyde or agents giving off formaldehyde, new 2.2'-dihydroxydiphenyl methane compounds can be obtained of the general formula:

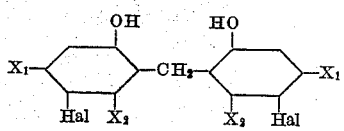

In this formula, in both benzene rings, Hal represents halogen, one X represents hydrogen or halogen and the other X represents halogen or the trifluoromethyl group.

The new 2.2'-dihydroxydiphenyl methane compounds have an excellent germicidal action and are distinguished from other similar previously known compounds by a superior range of activity.

For economical reasons, advantageously chlorine atoms, however also bromine atoms, come into consideration as halogen substituents in the 4-halogen-1-hydroxybenzenes of the above definition usable according to the present invention. As suitable phenols may be named: 3.4-dichloro-1-hydroxybenzene, 3.4.5-trichloro-1-hydroxybenzene, 3.4 - dibromo - 1 - hydroxybenzene, 3-chloro-4-bromo- and 3-bromo-4-chloro-1-hydroxybenzene, and in particular, 3-trifluoromethyl-4-chloro-1-hydroxybenzene. Of the 4-chlorophenols usable according to the present invention which are of practical interest, 3.4-dichlorophenol produces more active condensation products than 3.4.5-trichlorophenol and 3-trifluoromethyl-4-chlorophenol produces the most valuable condensation product according to the present invention both with regard to activity and also range of action.

The condensation of the 4-halogen phenols usable according to this invention with formaldehyde or with agents giving off formaldehyde is performed by methods known per se, for example in concentrated sulphuric acid in the presence or absence of organic solvents or diluents such as lower alcohols. Concentrated aqueous solutions of formaldehyde or of paraformaldehyde come into question as formaldehyde or agents giving off formaldehyde.

In contrast to the known halogenated 2.2'-dihydroxydiphenyl methane compounds which either have no free o-position to the hydroxyl group or have no neighbouring position to the halogen atom in p-position occupied, the new diphenyl methane derivatives according to this invention have the advantage of an increased activity and, in particular, a superior range of action as they are also active against certain gram-negative bacteria.

The 2.2'-dihydroxydiphenyl methane derivatives according to the present invention are white, clearly crystalline powders which have no smell and most of which have a definite melting point. They dissolve a little in water, but well in lower alcohols and ketones such as ethyl alcohol or acetone. In water, their mono-alkali salts only dissolve a little but their di-alkali salts dissolve well. For disinfection purposes the new diphenyl methane compounds are used in aqueous or organic solution or dispersion and can be incorporated for this purpose, for example in cleaning agents, ointment bases, tooth pastes, creams, etc.

The following examples illustrate the invention without limiting it in any way. Parts are always given as parts by weight and the temperatures are in degrees centigrade.

EXAMPLE 1

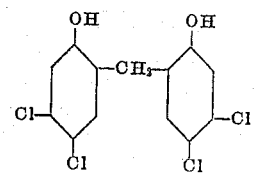

16.3 parts of 3.4-dichloro-1-phenol are dissolved in 16 parts of methanol; this solution is added dropwise within 3 hours to 250 parts of 80% sulphuric acid at 0–5°. 1.5 parts of formaldehyde (as about 40% solution) are then added dropwise within 6 hours at 0–5° whereupon the whole is stirred for 24 hours at 5–10°. The reaction product is poured onto ice and the body which then precipitates is isolated, washed with water and dissolved as disodium salt in diluted caustic soda lye. A few resinous side products are removed from this solution by filtration and the latter is acidified with hydrochloric acid. The body which then precipitates as a powder is filtered off, washed with water until a neutral reaction is obtained and recrystallised twice from benzene. A white crystalline powder with a melting point of 194–196° is so obtained.

$C_{13}H_8O_2Cl_4$:

Calculated _____ C 46.2; H 2.39; Cl 42.0%
Found _____ C 46.0; H 2.64; Cl 41.7%

EXAMPLE 2

16.3 parts of 3.4-dichloro-1-phenol are dissolved in 65 parts of glacial acetic acid. This solution is then slowly added dropwise at 0–5° to 160 parts of 93% sulphuric acid. 1.5 parts of formaldehyde (as about 40% aqueous solution) are added at 0–5° and the whole is stirred for 16 hours at 5–10°. The reaction product is poured on to ice and worked up as described in Example 1. A white crystalline powder is obtained which melts at 194–196°. If 19.8 parts of 3.4.5-trichloro-1-phenol are used instead of 16.3 parts of 3.4-dichloro-1-phenol and the same procedure is followed, after recrystallising from benzene/petroleum ether, a white body is obtained which melts at 198–200°.

$C_{13}H_6O_2Cl_6$:

Calculated _____ Cl 52.3%
Found _____ Cl 52.0%

EXAMPLE 3

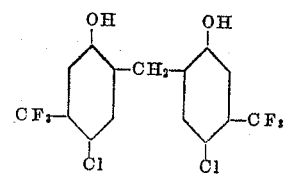

19.7 parts of 3-trifluoromethyl-4-chloro-1-phenol are

TABLE.—BACTERICIDAL ACTIVITY

| Compound | Staphylococcus aureus | Staphylococcus albus | Escherichia coli | Salmonella paratyphosa | Salmonella schottmülleri | Salmonella enteritidis | Eberthella thyphosa | Shigella paradysenteriae | Pseudomonas pyocyanes |
|---|---|---|---|---|---|---|---|---|---|
| 2.2′-dihydroxy-4.5.4′.5′-tetrachlorodiphenyl methane | 6.2 | 6.2 | 333 | 333 | 333 | 333 | 222 | 333 | 500 |
| 2.2′-dihydroxy-4.4′-bis-trifluoromethyl-5.5′-dichlorodiphenyl methane | 3.1 | 3.1 | 500 | 222 | 333 | 500 | 222 | 333 | 500 |
| 2.2′-dihydroxy-4.5.6.4′.5′.6′-hexachlorodiphenyl methane | 6.2 | 12.5 | 333 | 222 | 500 | 500 | 148 | 500 | X |

X = no bactericidal effect at 500×10⁻⁶ mol.

dissolved in 200 parts of 93% sulphuric acid. 4.1 parts of a 37% aqueous formaldehyde solution are added dropwise within 5–6 hours to this solution at 5–10°. The whole is then stirred for 20 hours during which time the temperature is raised to 20°. The reaction mass is poured on to ice, the body which precipitates is isolated and subjected to steam distillation. In this process the unchanged trifluoromethyl-chlorophenol passes over with the steam. The condensation product, thus freed from the starting material is dissolved in 200 parts of water with caustic soda lye as disodium salt. The resinous side products are removed and it is acidified with hydrochloric acid. The condensation product so obtained is still impure. It is recrystallised from benzene therefore whereupon white crystals are obtained. M. P. 181–182°.

$C_{15}H_8O_2Cl_2F_6$
Calculated _____ C 44.4; H 1.99; Cl 17.5%
Found _____ C 44.4; H 1.97; Cl 17.5%

*Method of comparing the bactericidal activity of disinfectants*

The bactericidal activity of a disinfectant is determined by the minimal concentration which with certainty will kill a standard suspension of test germs under certain conditions. The minimal bactericidal concentration is ascertained with graded concentrations according to the dilution process and is expressed in $10^{-6}$ mol.

*Test conditions*

Sterilised tap water added to 16 hour agar cultures serves as a standard suspension. Its transparency is brought to 85% in the so-called Hellige "Bio-Photo-Col" apparatus. The standard suspension is mixed with equal amounts of the graded solutions of the disinfectants to be tested (in aqueous solutions). Duration of test: 10 minutes. Temperature: 20° C.

At the end of 10 minutes, two sub-cultures from each reaction mixture are prepared with a glucose broth. The sub-cultures are bred at 37°. The development or sterility of the sub-cultures is determined after 48 hours.

What we claim is:
1. A 2.2′-dihydroxydiphenyl methane compound of the formula

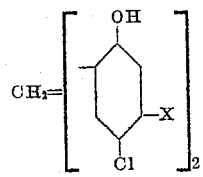

wherein X represents a member selected from the group consisting of chlorine and the trifluoromethyl group.

2. A 2.2′-dihydroxydiphenyl methane compound having the formula:

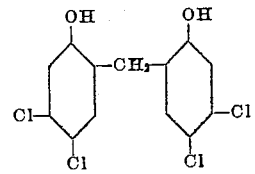

3. A 2.2′-dihydroxydiphenyl methane compound having the formula:

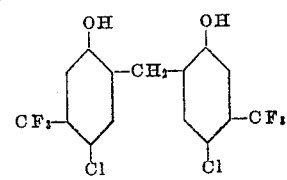

References Cited in the file of this patent

UNITED STATES PATENTS

| | | |
|---|---|---|
| 2,250,480 | Gump | July 29, 1941 |
| 2,353,725 | Gump | July 18, 1944 |
| 2,544,826 | Craig, Jr. | Mar. 13, 1951 |

FOREIGN PATENTS

| | | |
|---|---|---|
| 557,097 | Great Britain | Nov. 4, 1943 |

OTHER REFERENCES

"Industrial & Engineering Chemistry," March et al., vol. 41, pp. 2176–84 (1949).